(12) United States Patent
Müller et al.

(10) Patent No.: US 8,177,045 B2
(45) Date of Patent: May 15, 2012

(54) HYDRAULIC SYSTEM WITH A REGULATING CIRCUIT FOR CONTROLLING A MOTOR VEHICLE TRANSMISSION WITH AUTOMATED ACTUATION OF CLUTCHES

(75) Inventors: Holger Müller, Kaiserslautem (DE); Mario Schaufler, Kehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 71 days.

(21) Appl. No.: 12/315,977

(22) Filed: Dec. 6, 2008

(65) Prior Publication Data

US 2011/0155533 A1 Jun. 30, 2011

Related U.S. Application Data

(60) Provisional application No. 61/005,628, filed on Dec. 6, 2007.

(51) Int. Cl.
*B60W 10/02* (2006.01)
*B60W 10/10* (2012.01)
*F16D 25/10* (2006.01)

(52) U.S. Cl. ............... 192/3.58; 192/48.601; 192/85.63

(58) Field of Classification Search .............. 192/48.601
See application file for complete search history.

(56) References Cited

U.S. PATENT DOCUMENTS

| | | | | |
|---|---|---|---|---|
| 4,057,132 A | * | 11/1977 | Hattori et al. | 192/48.601 |
| 2005/0252326 A1 | * | 11/2005 | Mueller et al. | 74/335 |
| 2006/0009326 A1 | * | 1/2006 | Stefina | 477/127 |
| 2007/0020119 A1 | * | 1/2007 | Kruse et al. | 417/312 |
| 2007/0062773 A1 | * | 3/2007 | Moehlmann et al. | 192/3.58 |

* cited by examiner

*Primary Examiner* — Richard M. Lorence
(74) *Attorney, Agent, or Firm* — Alfred J. Mangels

(57) ABSTRACT

A hydraulic system for controlling a motor vehicle transmission having automated actuation of clutches. The hydraulic system includes a first valve connected downstream from a hydraulic energy source for producing a system pressure to control and/or regulate a clutch pressure. A second valve is connected downstream from the first valve and ahead of two clutches of the motor vehicle transmission to control and/or regulate the clutch pressure, wherein the second valve includes a regulating circuit to regulate the clutch pressure.

15 Claims, 3 Drawing Sheets

HYDRAULIC SYSTEM WITH A REGULATING CIRCUIT FOR CONTROLLING A MOTOR VEHICLE TRANSMISSION WITH AUTOMATED ACTUATION OF CLUTCHES

BACKGROUND OF THE INVENTION

1. Field of the Invention

The present invention relates to a hydraulic system for controlling a motor vehicle transmission with automated actuation of clutches, the system including a first valve connected downstream from a hydraulic energy source for producing a system pressure, to control and/or regulate a clutch pressure. A second valve is connected downstream from the first valve and ahead of two clutches of the motor vehicle transmission with automated actuation of clutches to control and/or regulate the clutch pressure.

2. Description of the Related Art

Motor vehicle transmissions with automated actuation of clutches can be semi-automated, automated, or automatic transmissions. They are, for example, a shift transmission with electric clutch management, in which the clutch is actuated automatically, an automated shift transmission, for example a dual-clutch transmission, an automatic transmission with a stepped automation unit, or a continuously variable automatic transmission (CVT), such as, for example, a belt-driven conical-pulley transmission.

Hydraulic systems for controlling a motor vehicle transmission with automated actuation of clutches are known. In such hydraulic control systems, electrical proportional valves can be employed in order to convert an electrical current to a hydraulic pressure. Individual functions of the hydraulic system can be actuated with the aid of that pressure. It is known to employ such hydraulic systems for motor vehicles having a so-called "shift-by-wire" functionality. It is also known to employ proportional valves that have a screen at an inlet of the proportional valve.

An object of the present invention is to provide an improved hydraulic system for controlling a vehicle transmission having automated actuation of clutches, in particular one that is more robust against occurrence of a back pressure under cold conditions, preferably using proportional valves having an inlet screen.

SUMMARY OF THE INVENTION

Briefly stated, in accordance with one aspect of the present invention, the object is achieved with a hydraulic system for controlling a motor vehicle transmission with automated actuation of clutches. A first valve is connected downstream from a hydraulic energy source for producing a system pressure to control and/or regulate a clutch pressure, and a second valve is connected downstream from the first valve and ahead of two clutches of the motor vehicle transmission having automated actuation of clutches in order to control and/or to regulate the clutch pressure. A regulating circuit is provided to regulate the clutch pressure.

It is conceivable, in particular under cold conditions, that a back pressure occurs at valves of the hydraulic system, for example, intensified by one or more inlet screens, and that the back pressure results in an undesired reaction of the subsequent downstream servo system. In particular, it can cause the clutch pressure to be increased so high that a creep moment occurs at one of the two clutches of the motor vehicle transmission having automated actuation of clutches, although no clutch moment is requested. Advantageously, such a reaction triggered by the increased back pressure can be compensated for by means of the regulating circuit.

The object is also achieved with a hydraulic system for controlling a motor vehicle transmission having automated actuation of clutches, and with a first valve connected downstream from a hydraulic energy source for producing a system pressure. The first valve controls and/or regulates a clutch pressure, and a second valve is connected downstream from the first valve and ahead of two clutches of the motor vehicle transmission having automated actuation of clutches, to control and/or regulate the clutch pressure by connecting an orifice plate parallel to the clutches by means of a parallel branch. An additional flow-through can be produced through the first and second valves by the orifice plate, which valves are connected in series and ahead of the orifice plate, with a reaction from a possibly occurring back pressure advantageously playing a smaller role, i.e., with better regulation of the clutch pressure being possible.

Preferred exemplary embodiments of the hydraulic system are distinguished by the fact that the parallel branch is assigned to a tank of the hydraulic system. The partial volumetric flow can be determined by means of a design of the baffle, and flows away into the tank.

Other preferred exemplary embodiments of the hydraulic system are distinguished by the fact that a control device of the regulating circuit contains the second valve. The regulating circuit can advantageously actuate the second valve, with direct influencing of the clutch pressure advantageously being possible. Advantageously, possible disturbance variables, caused for example by the back pressure, for example under cold conditions, can be compensated for.

Other preferred exemplary embodiments of the hydraulic system are distinguished by the fact that an electrically actuatable proportional valve is connected ahead of the second valve to actuate it. Advantageously, the second valve can be actuated by means of the second proportional valve by applying an electrical current.

Other preferred exemplary embodiments of the hydraulic system are distinguished by the fact that the control device of the regulating circuit contains the second proportional valve. The regulating circuit can advantageously actuate the second proportional valve, and thus the second valve connected downstream, by emitting an electric signal, for example a voltage.

Other preferred exemplary embodiments of the hydraulic system are distinguished by the fact that an electronic transmission controller contains a regulator of the regulating circuit to actuate the second proportional valve electrically. The regulator of the regulating circuit can be realized advantageously in a normally present electronic transmission control.

Other preferred exemplary embodiments of the hydraulic system are distinguished by the fact that a measuring device in the regulating circuit has a pressure sensor that is inserted between the second valve and the clutches. The pressure sensor can advantageously be assigned to the electronic transmission control, and thus to the regulating circuit. Advantageously, the pressure sensor can be a sensor that is already present anyway. Advantageously, there is also a desired value for the clutch pressure present in the electronic transmission control, which can advantageously be fed to the regulator implemented therein. The closed regulating circuit for regulating the clutch pressure contains the regulating device, the regulator implemented in the electronic transmission control, the first proportional valve, and the first valve and the pressure sensor for measuring the clutch pressure.

Other preferred exemplary embodiments of the hydraulic system are distinguished by the fact that a third valve for choosing gear ranges of the vehicle transmission with automated actuation of clutches is inserted between the clutches and the second valve, if the vehicle transmission is an automated shift transmission or an automatic transmission. It is possible to choose by means of the third valve among a park position, a forward drive range, a reverse drive range, a neutral position and a sport position. One of the clutches can optionally be actuated via the third valve to choose the forward and reverse driving ranges.

Other preferred exemplary embodiments of the hydraulic system are distinguished by the fact that a first electrically actuatable proportional valve is connected ahead of the first valve to actuate it. The first proportional valve can be used to actuate the first valve to control and/or regulate the clutch pressure.

Other preferred exemplary embodiments of the hydraulic system are distinguished by the fact that the regulating circuit contains a pressure return of the second valve. Advantageously, the regulating circuit for regulating the clutch pressure can include a hydraulic regulating circuit that is realized by means of the pressure return of the second valve.

Other preferred exemplary embodiments of the hydraulic system are distinguished by the fact that the pressure return has a pressure return surface, connected parallel to an actuating surface inserted after the second proportional valve and a pressure return surface that is pressurized with the clutch pressure. The regulating circuit can be realized advantageously as the hydraulic regulating circuit, i.e., without additional electronics, to regulate the clutch pressure. The hydraulic regulating circuit can also be combined in cascaded form as an inner regulator with the regulator realized by means of the electronic transmission control.

The problem is additionally solved with a vehicle transmission having automated actuation of clutches with a hydraulic system described previously. The benefits described previously result.

The problem is additionally solved with a motor vehicle with a vehicle transmission having automated actuation of clutches with a hydraulic system described previously. The benefits described previously result.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
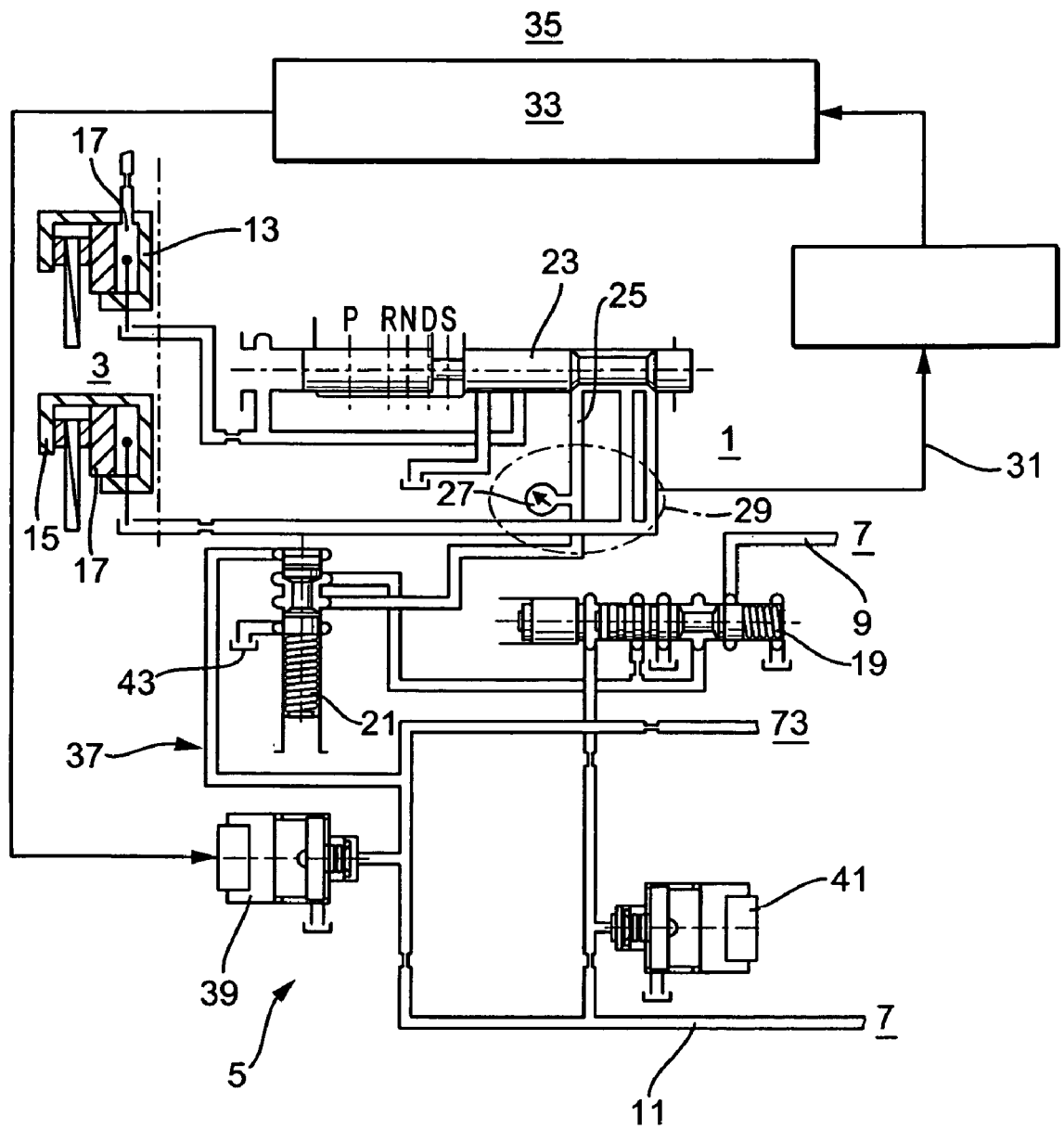
FIG. 1 is a circuit diagram of an embodiment of a hydraulic system in accordance with the present invention for controlling a vehicle transmission having automated actuation of clutches, namely a continuously variable transmission (CVT) with a regulating circuit to regulate a clutch pressure.

FIG. 1 shows a hydraulic system 1 for controlling a CVT 3 of a motor vehicle 5. The CVT 3 is part of a power train not shown in greater detail of motor vehicle 5, and can be assigned to a drive unit, for example a combustion engine and drive wheels. Hydraulic system 1 is suppliable with hydraulic energy by means of a hydraulic energy source that is merely indicated by means of reference label 7. Hydraulic energy source 7 can be a pump. Hydraulic energy source 7 is designed to provide a system pressure 9 and a preferably reduced pilot pressure 11. Additional hydraulic function elements, not depicted, for example valves, can be connected between hydraulic energy source 7 and the hydraulic system 1 shown in FIG. 1. CVT 3 has a first clutch 13 and a second clutch 15. First clutch 13 can be designed for example as a reverse travel clutch, and second clutch 15 as a forward travel clutch. Clutches 13 and 15 each have a pressurizable actuating cylinder 17, with clutches 13 and 15 being disengaged in the unpressurized state. A reversed design, i.e., engagement with actuating cylinder 17 in the unpressurized state, is also conceivable. The actuating cylinders 17 of clutches 13 and 15 are actuatable by means of hydraulic system 1. To this end hydraulic system 1 has a first valve 19, a second valve 21 and a third valve 23. First valve 19 is pressurizable with the system pressure 9 by means of hydraulic energy source 7. Connected downstream from first valve 19 is second valve 21, which in turn is connected upstream from third valve 23. First and second valves 19, 21 are designed to regulate and/or control a clutch pressure which is present at third valve 23. Third valve 23 is designed for choosing gear ranges of the CVT: in the present case a park position identified by P, a reverse driving range identified by R, a neutral position identified by N, a first driving range identified by D and a second driving range identified by S. Third valve 23 is designed in particular to optionally apply the clutch pressure 25 to the clutches 13 and 15. The interaction of valves 19 through 23 to actuate clutches 13 and 15 is known, so they will not be examined in greater detail here.

Hydraulic system 1 has a pressure sensor 27 to measure the clutch pressure 25. Pressure sensor 27 is part of a measuring device 29 or of a measuring element 29 of a regulating circuit 31 for controlling and/or regulating the clutch pressure 25. Measuring device 29 is assigned to a regulator 33 of regulating circuit 31. Regulator 33 can be implemented advantageously in a transmission control indicated by reference label 35 for regulating and/or controlling the hydraulic system 1 of the CVT 3. Regulator 33 of regulating circuit 31 is assigned to an adjusting device 37 to influence or control clutch pressure 25. Adjusting device 37 contains second valve 21 and a second proportional valve 39 for hydraulic actuation of second valve 21. Second proportional valve 39 and a first proportional valve 41, designed to actuate first valve 19 hydraulically, are pressurizable with pilot pressure 11 and are actuatable by means of electrical signals. The electrical signals can be generated for example by means of electrical transmission control 35, in particular regulator 33. Second valve 21 can normally realize a safety function of hydraulic system 1, while third valve 23 and therefore the downstream clutches 13 and 15 are assignable to a tank 43 of hydraulic system 1 for rapid and absolute depressurizing. The actuation necessary therefore can be accomplished in a priority circuit by means of electronic transmission control 35, using second proportional valve 39. Advantageously, regulator 33 can utilize the same signal path to regulate the clutch pressure 25. Advantageously, regulating circuit 31 can compensate for or regulate out disturbances that influence the clutch pressure 25 in an undesired manner. Such disturbances can occur for example under cold conditions in the form of an elevated back pressure. In particular, such an elevated back pressure can be caused or reinforced by filters provided on the proportional valves 39, 41. Advantageously, exact adjustment of the clutch pressure 25 is possible in spite of these disturbances. To this end, a desired pressure or desired value for the clutch pressure 25 which is present in electronic transmission control 35 can be sent to the regulator 33 of the electronic transmission control 35.

Figure 2:
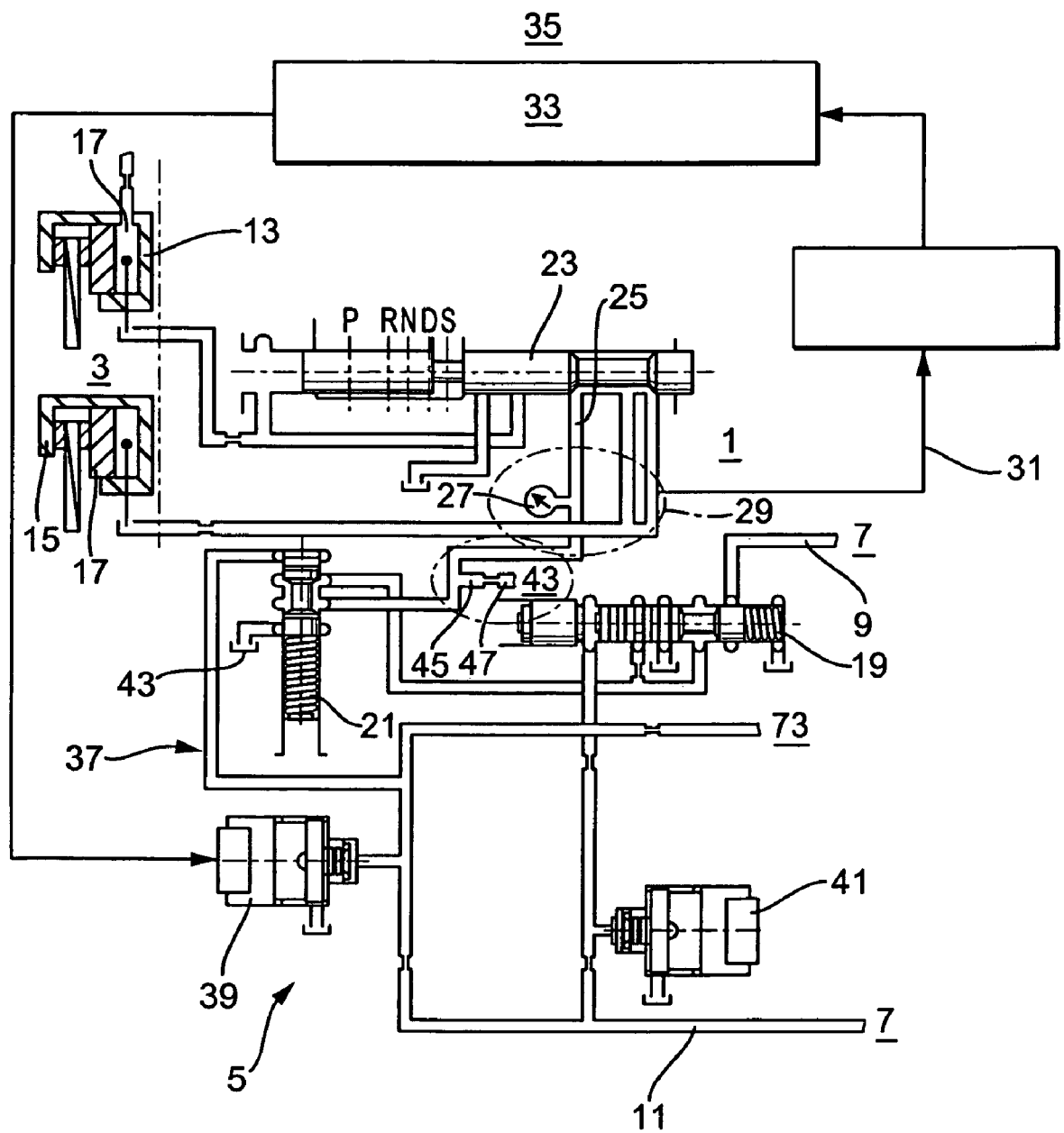
FIG. 2 is a circuit diagram of another embodiment of a hydraulic system similar to the hydraulic system shown in FIG. 1, but having an additional orifice plate.

FIG. 2 shows another exemplary embodiment of a hydraulic system 1, substantially analogous to the hydraulic system 1 shown in FIG. 1. The following section will examine only the differences. In contrast, the hydraulic system 1 according to FIG. 2 has a parallel branch 45 that is connected parallel to third valve 23 and clutches 13, 15. A baffle 47 is connected into parallel branch 45. Advantageously, second valve 21 is assigned to tank 43 of hydraulic system 1 through baffle 47 of parallel branch 45. Since valves 19 and 21 are connected behind each other, an additional portion of flow volume can be produced by means of parallel branch 45 and baffle 47 through valves 19 and 21, which can be fed to tank 43. Advantageously, this additional flow volume can reduce the influence for example of a back flow that arises at valves 19 and 21 when regulating the clutch pressure 25.

Figure 3:
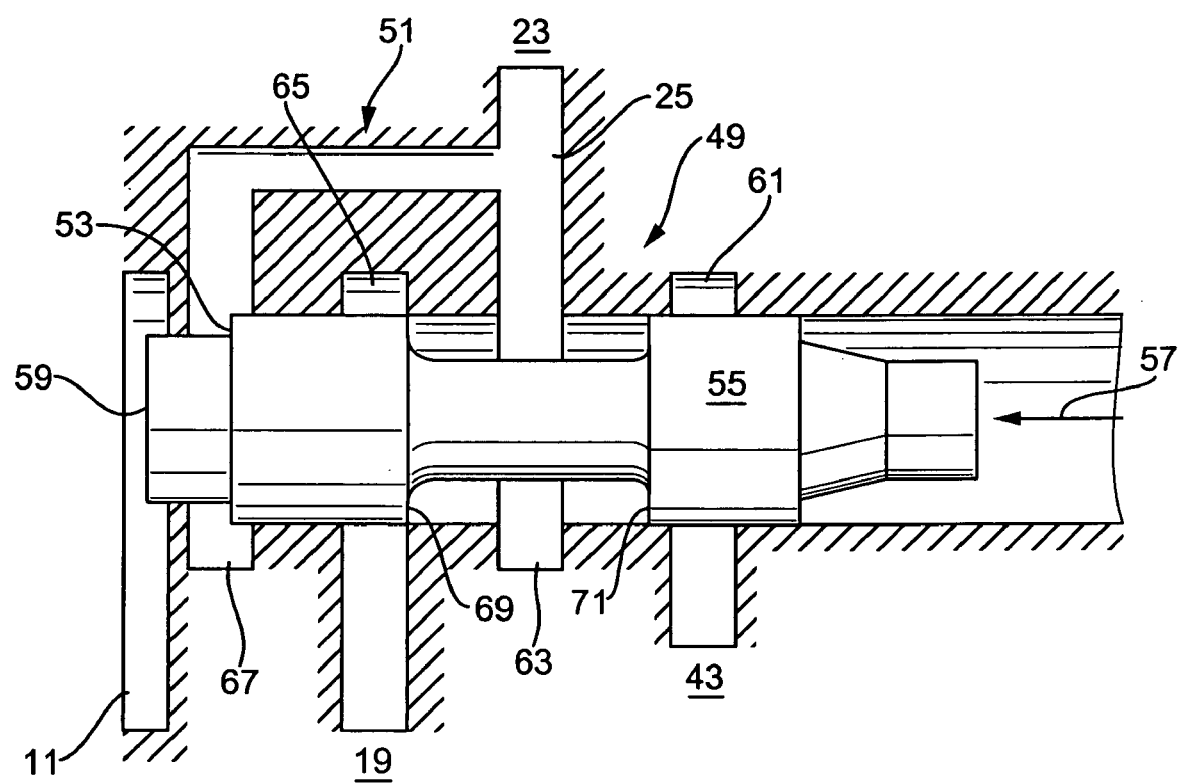
FIG. 3 is a cross-sectional view of a valve for a hydraulic system in accordance with the hydraulic systems shown in FIGS. 1 and 2, but having a pressure return to regulate a clutch pressure.

FIG. 3 shows a schematic sectional view of a safety valve 49 of a hydraulic system 1. Safety valve 49 has essentially the structure of second valve 21 shown in FIGS. 1 and 2. As an essential difference, safety valve 49 also has a pressure return 51. Pressure return 51 leads the clutch pressure 25 back to a return surface 53 of a control piston 55 of safety valve 49. This can cause a force directed to the right, viewed in the orientation of FIG. 3, to be exerted on control piston 55. Opposing this is a spring force of a spring of safety valve 49 (not shown in further detail), indicated by an arrow 57. Also acting contrary to the spring force, control piston 55 has an actuating surface 59 that can be pressurized by the pilot pressure 11, in particular under the control of second proportional valve 39. Safety valve 49 has a first lamina 61 assigned to tank 43, a second lamina 63 assigned to third valve 23, a third lamina 65 assigned to first valve 19 and a fourth lamina 67 assigned to return surface 53. Pressure return 51 connects second lamina 63 with fourth lamina 67, in order to conduct the clutch pressure 25 to return surface 53. It is obvious that a higher clutch pressure 25 brings about a deflection of control piston 55 to the right, seen in the direction of FIG. 3, while a first control flank 69 further blocks third lamina 65, which ultimately results in a drop in the clutch pressure 25. Therefore the pressure return 51 can realize a hydraulic regulator to regulate the clutch pressure 25, in the present case to lower the clutch pressure 25. When control piston 55 of safety valve 49 is shifted further to the right, a second control flank 71 connects second lamina 63 to first lamina 61, whereupon the clutch pressure 25 completely collapses to the tank level of tank 43, and thus the clutches 13 and 15 connected downstream are switched to zero pressure. Advantageously, this function remains unimpaired despite the pressure return 51. Second proportional valve 39, as depicted in FIGS. 1 and 2, is also assigned to a cooling oil valve 73 (not depicted in greater detail) to control a cooling oil flow of clutches 13 and 15 for actuation. Safety valve 49 can likewise be actuatable jointly with such a cooling oil valve 73 by means of second proportional valve 39. Advantageously, the cooling oil function can be maintained despite the additionally provided pressure return 51. Advantageously, it can nevertheless be regulated as precisely as possible in the event of an excessive clutch pressure 25, caused for example by too high back pressure.

Advantageously, despite the possible occurrence of back pressure, in particular in cold conditions, the clutch pressure 25 can be regulated as precisely as possible by means of the hydraulic systems 1 shown in FIGS. 1 through 3, in particular to avoid reactions of the subsequent system, in particular the clutches 13 and 15.

This can also be done advantageously when using valves with optimized sensitivity to soil residue, in particular with an additional screen at the inlet. A so-called unwanted cooling moment at the clutches 13 and 15 can be compensated for or regulated out.

Advantageously, the usually present pressure sensor 27 can be used as part of a measuring device 29 of regulating circuit 31. Advantageously, the clutch pressure 25 can thereby be regulated through the software, implemented for example in electrical transmission control 35, by means of regulator 33. That makes it possible for example to regulate a possibly occurring excessive clutch pressure 25 down to the desired pressure.

In a variant as shown in FIG. 2, a partial volume flow can be forced through valves 19 and 21 by means of the baffle 47 of parallel branch 45 connected downstream from second valve 21, which can simplify regulating the clutch pressure 25 through second valve 21 or safety valve 49.

In another alternative version, as shown in FIG. 3, the overall regulation of the clutch pressure 25 can likewise be simplified by means of the pressure return 51 of the clutch pressure 25 to the suitably designable return surface 53 of safety valve 49. Advantageously, the second proportional valve 39, which is connected ahead of safety valve 49 for actuation, can also actuate another function, namely the cooling of clutches 13 and 15 by means of cooling oil valve 73. Advantageously, according to the design according to FIG. 3, the cooling function can nevertheless be triggered at a pilot pressure of preferably 3 bar. In addition, safety valve 49 can fulfill the safety function, i.e., the rapid bleeding of clutches 13 and 15 through first lamina 61 in the direction of tank 43; the pressure return 51 does not have the slightest influence on this function. Advantageously in the event of too high return pressure the clutch pressure 25 can be precision-regulated by means of pressure return 51.

With safety valve 49 designed according to the depiction in FIG. 3, it is advantageously also conceivable that even with valve 19 in a completely open position, it is nevertheless possible to start up and accelerate safely, although possibly uncomfortably.

The hydraulic systems 1 shown in FIGS. 1 through 3 can be combined with each other in any desired manner.

In summary, the result is a method in which, with the help of existing hardware components and a suitable software function, in particular electronic transmission control 35, an effect of a back pressure of the assigned first proportional valve 41 which is possibly most strongly pronounced at the first valve 19 can be suspended or compensated for under cold conditions, by measuring the real existing clutch pressure 25 using the existing pressure sensor 27 and regulating it with the aid of the second valve 21 of regulating circuit 31. Available variants are in particular the possibilities shown in FIGS. 1 through 3, which individually or in combination can simplify the forenamed regulation of the clutch pressure 25, in which case the variant according to FIG. 3 can enable starting up and accelerating even with first valve 19 completely blocked.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system for controlling a motor vehicle transmission having automated actuation of clutches, said hydraulic system comprising:

a first valve connected downstream from a hydraulic energy source for producing a system pressure to control and/or regulate a clutch pressure, a second valve connected downstream from the first valve and ahead of two clutches of the vehicle transmission with automated actuation of clutches to control and/or regulate the clutch pressure, a third valve for selecting gear ranges P, R, N, D, S of the vehicle transmission with automated actuation of clutches is connected between the clutches and the second valve, and a regulating circuit for regulating the clutch pressure.

2. A hydraulic system in accordance with claim 1, including a baffle connected parallel to the clutches in a parallel branch.

3. A hydraulic system in accordance with claim 2, wherein the parallel branch is connected with a tank of the hydraulic system.

4. A hydraulic system in accordance with claim 1, wherein an adjusting device of the regulating circuit includes the second valve.

5. A hydraulic system in accordance with claim 1, wherein an electrically actuatable proportional valve is connected ahead of the second valve to actuate it.

6. A hydraulic system in accordance with claim 5, wherein an adjusting device of the regulating circuit includes a second proportional valve.

7. A hydraulic system in accordance with claim 6, including an electronic transmission control that includes a regulator of the regulating circuit to electrically actuate the second proportional valve.

8. A hydraulic system in accordance with claim 1, wherein a measuring device of the regulating circuit includes a pressure sensor connected between the second valve and the clutches.

9. A hydraulic system in accordance with claim 1, wherein a first, electrically actuatable proportional valve is connected ahead of the first valve to actuate it.

10. A hydraulic system in accordance with claim 1, wherein the regulating circuit includes a pressure return of the second valve or of a safety valve.

11. A hydraulic system in accordance with claim 10, wherein the pressure return includes a pressure return guiding surface which is connected parallel to an actuating surface that is downstream from the second proportional valve and which pressure return guiding surface is pressurized with the clutch pressure.

12. A vehicle transmission with automated actuation of clutches, having a hydraulic system in accordance with claim 1.

13. A vehicle transmission in accordance with claim 12, wherein the transmission is at least one of a shift transmission with electric clutch management, an automated shift transmission, a double-clutch transmission, an automatic transmission with a stepped automatic system, and a continuously variable transmission (CVT).

14. A motor vehicle having a vehicle transmission in accordance with claim 13.

15. A motor vehicle having a vehicle transmission in accordance with claim 12.

* * * * *